UNITED STATES PATENT OFFICE.

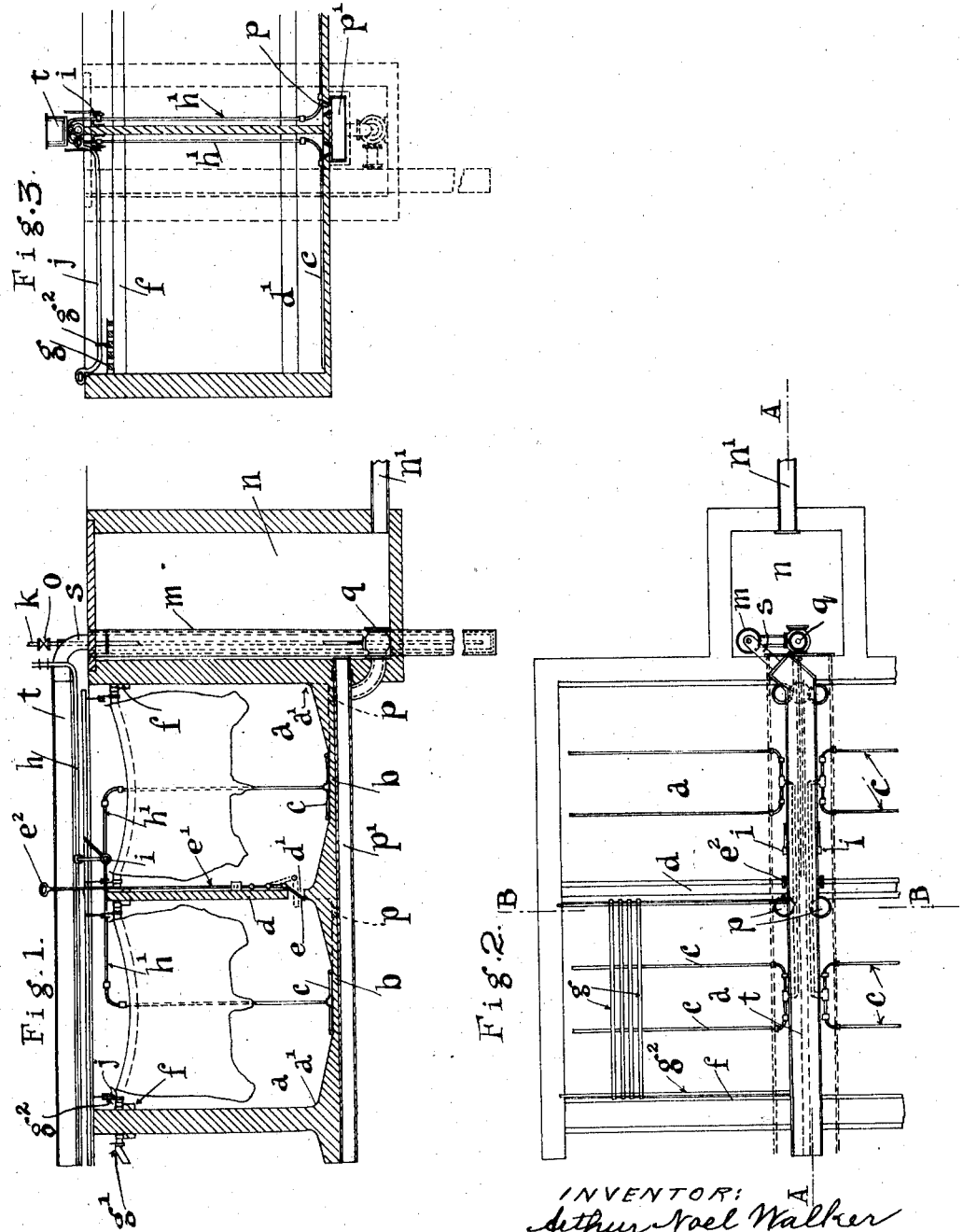

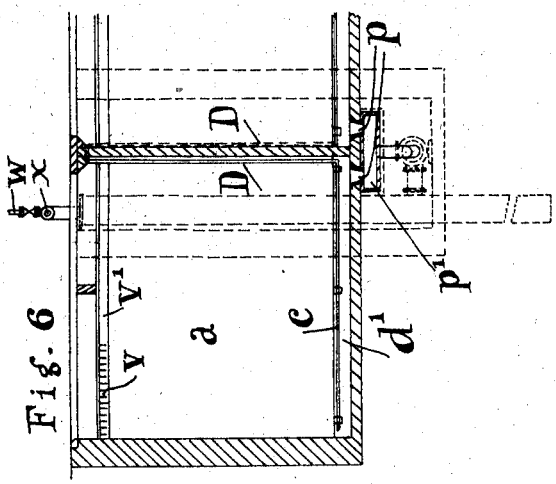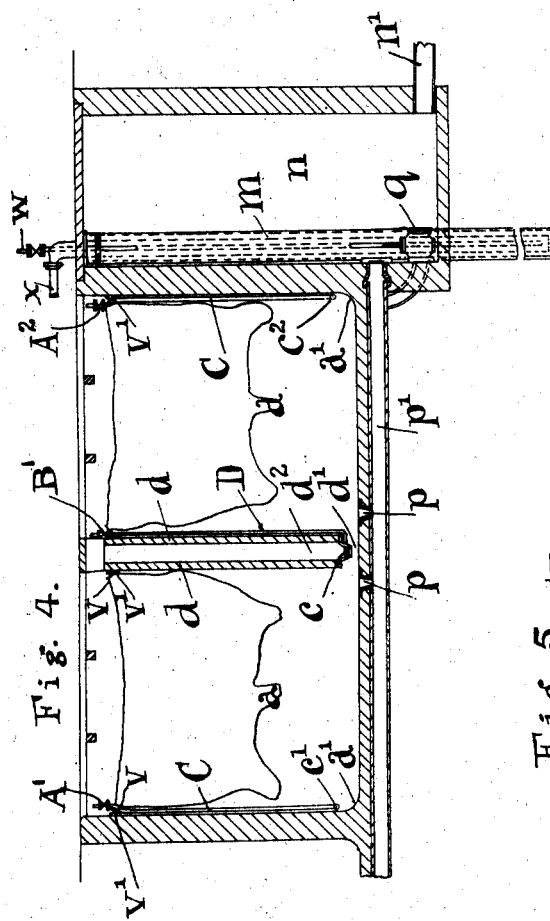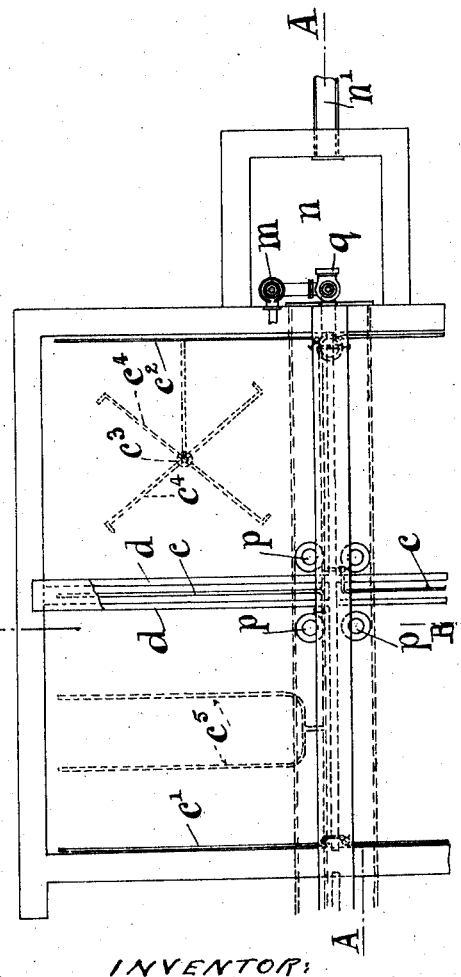

ARTHUR NOEL WALKER, OF BOLTON, ENGLAND.

APPARATUS FOR TREATING HIDES.

1,396,699.

Specification of Letters Patent.

Patented Nov. 8, 1921.

Application filed February 4, 1920. Serial No. 356,359.

(GRANTED UNDER THE PROVISIONS OF THE ACT OF MARCH 3, 1921, 41 STAT. L., 1313.)

*To all whom it may concern:*

Be it known that I, ARTHUR NOEL WALKER, a subject of the King of Great Britain and Ireland, residing at Rose Hill Tannery, Bolton, in the county of Lancaster, England, have invented new and useful Improvements in Apparatus for Treating Hides (a patent has been granted in Great Britain, No. 124,992, dated 12th July, 1918), of which the following is a specification.

The invention relates to improvements in or connected with plant or devices used in the treatment of hides during soaking, liming, tanning, leaching and kindred processes in connection with tanning either by the vegetable, chrome or other chemical processes.

It is known to introduce air or other fluid into the liquor contained in the pit or vats used in the treatment of hides either by blowing same into the liquor or through discharge pipes, and circulation of the liquor by gravity or pump is in common use, with the hides lying flat or suspended in the liquor, and it is to developments of the system of introducing air and special hanging of the hides with which I am concerned.

I propose to work with pits specially constructed with a central partition or dividing wall the top of which will be at a lower level than the boundary of the containing walls of the pit also below the level of the liquid contained in the pits, and at the bottom of the partition will be formed an aperture or passage way the size of which can be regulated and I can at will by the introduction of air, gas, etc., into one section of the pit set up a circulation of the liquor contained in both sections.

The air, gas, etc., at any desired temperature and pressure most suitable to the requirements of any particular process is conveyed to the pits or vats by means of pipes having one or more distributing pipes arranged along the bottom of each section of the pits; these distributing pipes would be perforated along the horizontal center line and the pit bottom would be so constructed as to allow the distributing pipes to lie in a channel and on the discharge of air or gas etc., the formation of the pit bottom would, with the upward movement of the liquor, circulate any heavy particles in the liquor which would fall toward the distributing pipes.

In carrying out this improved system the air, gas, etc., is introduced under pressure produced by suitable plant consisting of a compressor discharging into a receiver from which distributing mains and branch services carry the supply to each pit. The air or gas before entering the compressor passes through a chamber provided with heating batteries to raise the temperature as desired. The air or gas is conveyed to the two sections of each pit by a single pipe from the main supply pipe and before entering the pit is branched into two pipes one to each section. At this junction a two way valve or automatic two way valve is inserted so as to control the supply of air or gas and allow the air or gas to enter one section of the pit only at a time. The air or gas being discharged from the distribution pipes previously described would cause the liquor to rise and pass over the central partition and so set up a circulation in the liquor which would be drawn from the adjoining section through the aperture in the central partition to be again carried up to the surface. After a period the two way valve would be turned so as to discharge air into the adjoining pit and reverse the circulation.

Under this treatment the hides in each section of the pit are arranged to hang over laths and the alternate circulation has a beneficial effect on the hides under treatment.

The laths over which the hides are hung are supported at one end by a batten fixed along the central partition a short distance below the top edge and at the other end by a batten fixed along the end of the pit at the same level. Each lath would be fitted with a hook at each end to receive the hide and hold it in position and to reduce the natural curvature of the hides the laths are made with concave upper edge.

Under present conditions the hides undergoing treatment are dragged from pit to pit to receive various strengths of liquor but under this improved treatment I propose to allow the hides to remain in one pit until the particular process of soaking, liming, de-liming, chroming or tanning is complete and by this treatment the liquor in the pit containing the hides would be ejected by means of compressed air or gas, and such discharged liquor can be conveyed to another pit and the pit so emptied could then be filled with liquor from another pit by the same process and by so doing I vary the strengths of the liquor without the removal of the hides from the pits. This eliminates an excessive handling of the hides by rendering unnecessary the changing of the hides from pit to pit during soaking, liming, or other process.

The invention possesses many advantages which I will enumerate later, and is readily applicable in existing pits, in many cases small alterations only being necessary to secure its full advantages.

In the following detailed description of the invention I will refer to the accompanying drawings in which:—

Figure 1 is a longitudinal section of the pits on the line A—A, Fig. 2.

Fig. 2 is a plan thereof.

Fig. 3 is a cross section on the line B—B, Fig. 2.

Figs. 4 to 6 are similar views of a modification of the invention.

I will describe the arrangement and construction illustrated in Figs. 1 to 3.

The pits $a$ are or may be constructed of bricks, concrete or timber formed with the bottom laid to slopes with rounded angles $a'$ to facilitate concentration of suspended matters over the region of activity of the air or gas, and having a flat space $b$ formed between the slopes to accommodate air pipes $c$. Each pit is fitted with a central partition $d$ the top of which is set below the level of the containing walls of the pit as shown in Fig. 1. This partition $d$ is provided at the base with apertures $d'$ fitted with suitable shutters or valves $e$ actuated by the rod $e'$ and handle $e^2$ to regulate the circulation which is set into operation over this partition by means of the alternating control valve on the air or gas service. Wood battens $f$ are fixed on the side of the pits to receive the ends of the laths $g$ which can be used for hide suspension. These laths $g$ are specially shaped with a concave supporting surface for the hides as shown in Fig. 1.

The main air pipe $h$ is connected to branch pipes $h'$, $h'$ by means of which air or gas can be conducted to the air delivery pipes $c$ at the bottom of the pits.

This branch air or gas service pipe is fitted with a two way valve $i$ to operate the alternating circulation in the two sections of the pit shown in the drawings. The delivery pipes $c$ at the pit bottom are sub-divided into two branches passing the full length of the pit as shown clearly in Fig. 2. They have discharge holes at the sides of suitable diameter, so spaced as to insure a uniform pressure of gas or air at each hole through the entire length of pipe.

The operation of the two way valve $i$ permits the emission of air or gas in one section of the pit causing the liquors to rise and flow over the central partition $d$ on to the hides in the adjacent section. The change of the valve reverses the circulation, and this alternate circulation stretches and relaxes the hides alternately and tends to open the pores to the action of liquors thoroughly mixed and impregnated with the agents used in the process.

The hides, as stated, can be supported on special laths $g$ which by their shape assist the escape of accumulations of air or gas from the folded parts and in conjunction with the circulation of the liquor tend to straighten out the natural hide curvatures. The laths are provided with small hooks $g'$ to engage with and stretch the hides, and have a hook attachment $g^2$ at each end resting on lifting bars $j$.

By means of a lifting frame these bars can be used to raise the whole pack of hides from a pit in one operation for conveyance by runway apparatus to a further process.

The means provided for changing the liquors are as follows:

From the air service piping to each series of pits a branch $k$ it attached operating an air lift ejector apparatus in a liquor receiver $m$ placed in a special chamber $n$ at one end of the pits. The opening of a control valve $o$ brings this ejector into operation so that liquors may be drawn from any one pit through the drain outlet $p$ from the emptying trough $p'$ then through a two-way valve $q$ to the receiver and lifted through ejector pipe $s$ to the trough $t$ arranged between the pit series and distributed by means of sluices in the trough sides to other pits in the series without disturbance of the hides, or alternately can be discharged upon the hides in the same pit to accentuate downward passage of the liquors over them.

By means of the two-way valve $q$ the liquor may be discharged into the chamber $n$ and out at a main drain $n'$ to any desired point.

The arrangement of suspension laths with lifting bars above described renders the transport of hides in bulk a simple matter. For this purpose a runway girder arranged over a series of pits and carrying a lifting block operated by motor or cable power provides for the raising at once of the entire pack of hides from a pit transferring it thence to other pits or other parts of the yard for treatment in other processes. The arrangement of transport effects a great economy in labor and facilitates the rapid handling of the materials in process.

Figs. 4 to 6 show a modification in details.

In this arrangement the pits may be constructed, as before, of brick, concrete or timber with bottom having rounded angles $a'$ and accommodating air or gas pipes.

Each pit, however, is divided into two parts by double partitions $d$, $d$ forming a separate circulation chamber $d^2$ between the two sections of pit. The top of the chamber is set below the level of the surrounding pit walls and the lower edges terminate at a point above the pit bottom leaving apertures $d'$ to permit the free passage of liquor. In adapting old pits to my system, should it be found necessary to retain existing flat pit bottoms satisfactory results will still be obtained.

The main air pipe delivers air to three branches C, C, D, the delivery being controlled by valves $A'$, $A^2$ and $B'$. Two of these branches C, C, conduct air to the air delivery pipes $c'$, $c^2$, one in each division of the pit, which pipes $c'$, $c^2$ are carried along the pit side near the bottom or along the bottom with branches and have suitable apertures. Or the pipes C, C, might be carried along the pit bottom to the center of each section of the pit, the end of the pipe to be then turned up and fitted with an air tight swivel joint $c^3$ fitted with three or more horizontal pipe branches $c^4$ having nozzle ends with outlet at right angles to the branch as shown in dotted lines in the right hand portion of Fig. 5. On the opening of control valves $A'$, $A^2$ the air or gas would be emitted from the nozzles causing an upward circulation of the liquor and a revolving motion to the horizontal branch pipes on the swivel joint which would give further agitation to the sedimentation from the liquor.

As an alternative to this, branch air delivery pipes $c^5$, $c^5$ may be disposed centrally across the bottom of the pit as indicated in dotted lines at the left hand in Fig. 5. The third branch pipe D conducts air to the delivery pipe $c$, with similar openings to insure uniform pressure of air or gas throughout its length situated immediately beneath the circulation chamber $d^2$ between the two parts of the pit. The opening of the control valve $B'$ on the main air pipe permits the emission of air or gas and causes a large volume of liquor to rise through the circulation chamber $d^2$ and flow over the top of the divisions into both parts of the pit producing strong downward circulation of liquor over the hides in suspension.

The pipe D can be shut off and by the operation of the control valves $A'$, $A^2$ air or gas can be emitted from pipes $c'$, $c^2$ causing upward circulation of liquors through the pits. In the arrangement shown in Figs. 4 to 6 the hides are shown to be suspended by hooks $v$ supported on rails $v'$ fixed to the pit sides. By this method the hides are stretched across the pits and get full advantages of the liquor in circulation.

For the changing of liquors a branch pipe $w$ from the air service pipe is carried to the end of each series of pits to operate an air lift ejector apparatus in air lift receiver $m$ placed in the chamber $n$ at the end of the pits. The operation of the air lift is as already described for the arrangement shown in Figs. 1 to 3 but the liquor is delivered into a flexible pipe $x$ for distribution to other pits or circulation as already mentioned.

The advantages accruing are many and important.

1. The saving of time.

The circulation of the liquor in the pits maintains the hides in unbroken contact with the active agents of the process. In the ordinary liming system the liquor in contact with the hides becomes rapidly exhausted, and soon they must be drawn again, whereas by this invention the liquor is maintained constantly in a full strength condition and its maximum effect is continuously exerted, thus very considerably shortening the process only about one half of the ordinary time being required.

2. Saving of materials.

Tanners in liming processes generally use 7 to 10 lbs. of lime per hide whereas not more than 2 lbs. of lime is actually absorbed. In this process, the liquors being kept continuously in agitation there is no need for any excess of material and indeed the amount of lime may be reduced to one third of that required in ordinary systems.

3. Lime solutions.

The strengthening of lime solutions by the addition of fresh lime can be superseded by the system of producing as a separate operation liquors of suitable strength which can be transferred to a pit or series of pits as necessity requires. Thus only milk of lime is introduced to the pits and lumps of unslacked lime or other foreign matters are excluded and all risks of hides receiving lime burns are completely eliminated.

The system of suspension greatly improves the liming of the hides by avoiding close contact between their surfaces the lime solution is thus permitted to produce continuous action over their whole surface.

The reduced quantity of lime used is not only saving in initial cost of material but the difficulty of sludge disposal and the problems of lime effluent are greatly diminished.

4. Saving of hide substance.

Since the process is considerably accelerated the loss of hide substance by bacterial and other solvent action is less than in ordinary systems.

5. Lime creases are avoided.

Grain damage in hauling the hides is eliminated. Greasy leather is largely obviated all these being important advantages in obtaining a high standard of product.

6. Increased output from existing plant.

By the reduction of time taken in liming and the saving of labor and material it is possible through this invention to increase the output without extension of plant.

7. Hair.

The hair is taken from the hides in a very clean condition.

8. Saving of labor.

Any process which reduces labor should strongly appeal to tanners at the present time. In this process the expenditure of labor is reduced as once the hides are suspended in the soaking pits no further handling is necessary until the liming process is completed.

The system provides for the transference of a liquor from one pit to another; thus as the liquors only are changed a great economy of labor is effected.

9. Labor shortage.

In the event of any circumstances arising in which the ordinary labor was temporarily unavailable, it would be quite possible under this invention for a foreman alone to circulate, discharge or change the liquor from pits and thus prevent the damage to the hides which would certainly arise in any sudden breakdown in the series of operations of the ordinary liming system.

I declare that what I claim is.

1. In an apparatus for the treatment of hides in the manufacture of leather, pits each constructed with central partition, the top of which is at a lower level than the boundary walls of the pit and below the level of the liquid therein, said partitions being provided with an aperture at the bottom thereof, and means for introducing a fluid under pressure into each section of the pit to enable a circulation of liquid to be effected from one section to the other, and a reverse circulation of the liquid at will.

2. In an apparatus for the treatment of hides in the manufacture of leather, the combination with pits constructed with a central partition and means for introducing fluid, as set forth in claim 1, of an air lift ejector whereby the pits can be emptied of liquid and the liquid conducted to any desired point for further use to enable hides to be treated by the various processes in the manufacture of leather without removing them from the pit.

3. In an apparatus for treating hides in the manufacture of leather as set forth in claim 1, the combination of means for supporting and carrying the hides and comprising side battens secured to the pits, laths supported on said battens and provided with a concave surface over which the hides are folded and with hooks to engage the edges of the hides, and hooks carried by said laths to engage with lifting bars by means of which the entire series of laths and hides can be removed from the pit.

4. In an apparatus for treating hides in the manufacture of leather, pits formed with a central double partition forming a separate circulation chamber between the pits the top of which is at a lower level than the boundary walls of the pit and below the level of the liquid therein and having a circulating aperture at the bottom of such double partitions, and with means for discharging fluid under pressure at the bottom of the central circulating chamber or in the pit at will, thereby to obtain a flow of liquid downward through such pit, or upward.

In testimony whereof I have signed my name to this specification.

ARTHUR NOEL WALKER.